United States Patent
Terayama et al.

(10) Patent No.: US 11,046,312 B2
(45) Date of Patent: Jun. 29, 2021

(54) VEHICLE TRAVEL SUPPORT DEVICE

(71) Applicant: SUBARU CORPORATION, Tokyo (JP)

(72) Inventors: Satoshi Terayama, Tokyo (JP); Masatoshi Hoshina, Tokyo (JP); Yasuhiro Sekijima, Tokyo (JP); Keisuke Kuwahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 462 days.

(21) Appl. No.: 15/867,398

(22) Filed: Jan. 10, 2018

(65) Prior Publication Data

US 2018/0281793 A1 Oct. 4, 2018

(30) Foreign Application Priority Data

Mar. 31, 2017 (JP) .............................. JP2017-070130

(51) Int. Cl.
*B60W 30/165* (2020.01)
*B60W 30/095* (2012.01)
(Continued)

(52) U.S. Cl.
CPC .......... *B60W 30/165* (2013.01); *B60W 30/09* (2013.01); *B60W 30/0956* (2013.01);
(Continued)

(58) Field of Classification Search
None
See application file for complete search history.

(56) References Cited

U.S. PATENT DOCUMENTS

| 10,369,997 B2 * | 8/2019 | Igarashi .............. B60W 30/165 |
| 2005/0159876 A1 * | 7/2005 | Sugano .............. B60K 31/0008 |
| | | 701/96 |

(Continued)

FOREIGN PATENT DOCUMENTS

| JP | 2004-078333 A | 3/2004 |
| JP | 2005-145153 A | 6/2005 |

(Continued)

OTHER PUBLICATIONS

Japanese Office Action issued in corresponding Japanese Patent Application No. 2017-070130, dated Dec. 18, 2018, with English Translation.

(Continued)

*Primary Examiner* — Peter D Nolan
*Assistant Examiner* — Demetra R Smith-Stewart
(74) *Attorney, Agent, or Firm* — McDermott Will & Emery LLP

(57) ABSTRACT

A vehicle travel support device includes: a guide route setting unit; a travel environment information acquisition unit; a target traveling path setting unit; an inter-vehicle distance keep control unit; a lateral movement amount calculation unit; an obstacle avoidance action detection unit; and a preceding vehicle following controller. The guide route setting unit sets a guide route for a host vehicle. The travel environment information acquisition unit acquires travel environment information. The target traveling path setting unit sets a target traveling path. The inter-vehicle distance keep control unit causes the host vehicle to travel to keep a set distance from a preceding vehicle. The lateral movement amount calculation unit calculates a lateral movement amount of the preceding vehicle. The obstacle avoidance action detection unit detects an obstacle avoidance action of the preceding vehicle. The preceding vehicle (Continued)

following controller sets the target traveling path to a traveling path of the preceding vehicle.

4 Claims, 5 Drawing Sheets

(51) Int. Cl.
*B60W 30/09* (2012.01)
*G08G 1/16* (2006.01)

(52) U.S. Cl.
CPC ... *B60W 2554/00* (2020.02); *B60W 2554/803* (2020.02); *B60W 2754/30* (2020.02); *G08G 1/165* (2013.01); *G08G 1/167* (2013.01)

(56) References Cited

U.S. PATENT DOCUMENTS

| | | | | |
|---|---|---|---|---|
| 2016/0121906 | A1* | 5/2016 | Matsuno | B60K 28/10 |
| | | | | 701/23 |
| 2017/0261984 | A1* | 9/2017 | Ichikawa | G05D 1/0088 |
| 2017/0329000 | A1* | 11/2017 | Masui | B60W 30/16 |

FOREIGN PATENT DOCUMENTS

| | | |
|---|---|---|
| JP | 2008-114672 A | 5/2008 |
| JP | 2015-160554 A | 9/2015 |
| JP | 2017-013678 A | 1/2017 |
| WO | 2017/009898 A1 | 1/2017 |

OTHER PUBLICATIONS

Office Action issued in corresponding Japanese Patent Application No. 2017-070130, dated Jun. 19, 2018.

* cited by examiner

VEHICLE TRAVEL SUPPORT DEVICE

CROSS-REFERENCE TO RELATED APPLICATIONS

The present application claims priority from Japanese Patent Application No. 2017-070130 filed on Mar. 31, 2017, the entire contents of which are hereby incorporated by reference.

BACKGROUND

1. Technical Field

The present invention relates to a vehicle travel support device that causes a host vehicle to follow a preceding vehicle when an obstacle avoidance action is determined on the basis of the lateral movement amount of the preceding vehicle.

2. Related Art

In self-driving, there is conventionally known preceding vehicle following control that detects a preceding vehicle in a target traveling path set ahead of a host vehicle and, when the inter-vehicle distance from the preceding vehicle becomes equal to or less than a set inter-vehicle distance, causes the host vehicle to travel in the target traveling path while keeping the inter-vehicle distance from the preceding vehicle at a predetermined value.

In such a self-driving technique, a target traveling path is set so that the host vehicle travels, for instance, in the middle of a travel lane defined by left and right lane marking lines such as lane lines and various types of travel control such as lane keep control are made so that the host vehicle travels in the target traveling path on the basis of travel environment information ahead of the host vehicle acquired by a camera, a radar, or a travel environment information acquisition unit including a combination thereof installed on the host vehicle and the map information and the host vehicle position information from a car navigation system.

By the way, when the preceding vehicle travels in the target traveling path set for the host vehicle and an obstacle such as a stopped vehicle or a falling object is present ahead of the preceding vehicle, the preceding vehicle of course takes an obstacle avoidance action. At this time, although the subsequent host vehicle also takes an obstacle avoidance action by recognizing the front obstacle as the preceding vehicle, since the front of the host vehicle is blocked by the preceding vehicle, a delay easily occurs in detection of the obstacle by the travel environment information acquisition unit, possibly making it difficult to take an obstacle avoidance action with an allowance.

As a measure against it, for instance, Patent Literature (Japanese Unexamined Patent Application Publication No. 2017-13678) discloses a technique that determines that obstacle avoidance has started when the lateral acceleration of the preceding vehicle exceeds a predetermined threshold, stores the lateral displacement amount at that time as the start time lateral displacement amount, determines that the preceding vehicle has taken an obstacle avoidance action when the difference between the lateral position of the preceding vehicle after a lapse of the predetermined time necessary for the avoidance action and the start time lateral displacement amount is equal to or less than a predetermined displacement amount difference, stops lane keep control, and causes the host vehicle to travel along the traveling track (that is, the traveling path for obstacle avoidance) of the preceding vehicle.

However, the technique disclosed in the above document cannot determine whether the preceding vehicle has taken an obstacle avoidance action until the completion of an obstacle avoidance action by the preceding vehicle is recognized.

Accordingly, since the host vehicle needs to follow the preceding vehicle with the distance corresponding to at least a predetermined time necessary to determine an obstacle avoidance action, it is difficult to sufficiently obtain the time necessary to determine an obstacle avoidance action by the preceding vehicle in the case of a travel while keeping a relatively small inter-vehicle distance such as a travel on a public road or the like, possibly making it difficult to take an obstacle avoidance action with an allowance.

In addition, when the preceding vehicle starts an obstacle avoidance action and then continuously travels in an adjacent lane without returning to the original lane, completion of the avoidance action cannot be detected and it is impossible to determine whether the preceding vehicle has taken an obstacle avoidance action.

SUMMARY OF THE INVENTION

It is desirable to provide a vehicle travel support device capable of early detecting an obstacle avoidance action by a preceding vehicle and causing a host vehicle to take an obstacle avoidance action with an allowance.

An aspect of the present invention provides a vehicle travel support device including a guide route setting unit, a travel environment information acquisition unit, a target traveling path setting unit, an inter-vehicle distance keep control unit, a lateral movement amount calculation unit, an obstacle avoidance action detection unit, and a preceding vehicle following controller. The guide route setting unit is configured to set a guide route for a host vehicle. The travel environment information acquisition unit is configured to acquire travel environment information ahead of the host vehicle. The target traveling path setting unit is configured to set a target traveling path through which the host vehicle travels along a travel lane of the guide route on a basis of the guide route set by the guide route setting unit and the travel environment information acquired by the travel environment information acquisition unit. The inter-vehicle distance keep control unit is configured to cause the host vehicle to travel so as to keep a set inter-vehicle distance from a preceding vehicle traveling in the target traveling path immediately ahead of the host vehicle when the preceding vehicle is detected on a basis of the travel environment information acquired by the travel environment information acquisition unit. The lateral movement amount calculation unit is configured to calculate a lateral movement amount of the preceding vehicle on a basis of behavior of the preceding vehicle acquired by the travel environment information acquisition unit. The obstacle avoidance action detection unit is configured to detect an obstacle avoidance action of the preceding vehicle on a basis of the lateral movement amount of the preceding vehicle calculated by the lateral movement amount calculation unit. The preceding vehicle following controller is configured, when the obstacle avoidance action detection unit detects the obstacle avoidance action of the preceding vehicle, to set the target traveling path for the host vehicle to a traveling path of the preceding vehicle and to cause the host vehicle to travel therethrough.

BRIEF DESCRIPTION OF THE DRAWINGS

FIG. 6A is an explanatory diagram for determining the stagger of the preceding vehicle, and FIG. 6B is an explanatory diagram for determining the obstacle avoidance action of the preceding vehicle.

DETAILED DESCRIPTION

Figure 1:
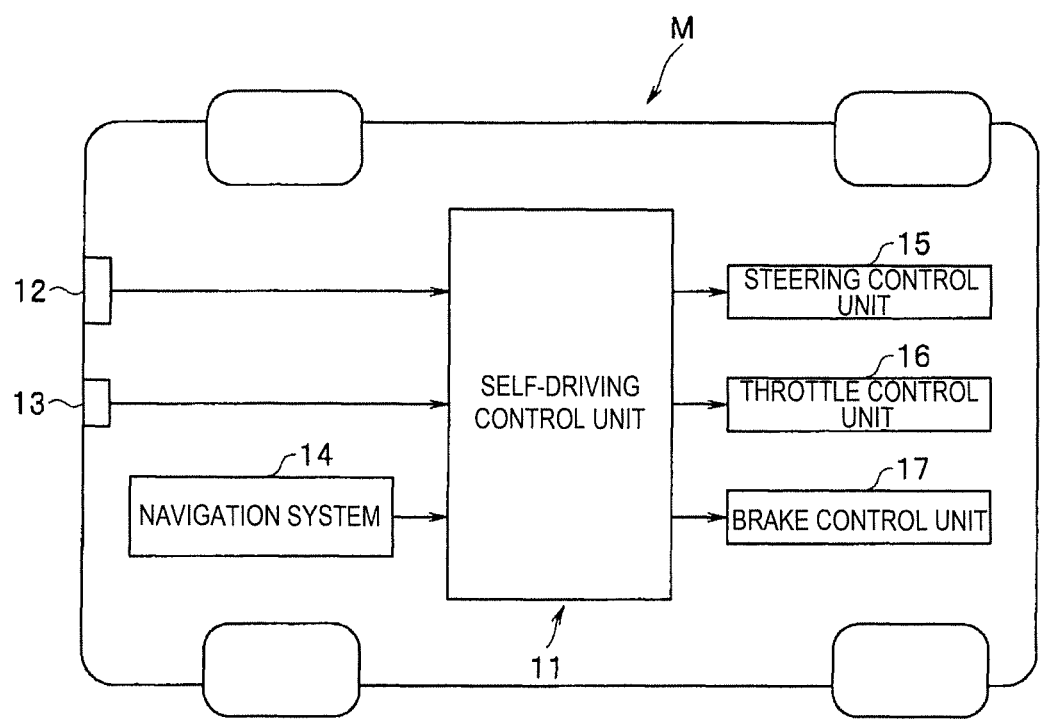
FIG. 1 is a structural diagram schematically illustrating a vehicle having a travel support device.

An example according to the present invention will be described below with reference to the drawings. In FIG. 1, a host vehicle M has a travel support device 1. The travel support device 1 has a self-driving control unit 11. A camera unit 12 and a radar unit 13 serving in this example as units that acquire the parameters necessary for self-driving and a navigation system 14 serving in this example as a guide route setting unit are coupled to the input side of the self-driving control unit 11. In addition, a steering control unit 15, a throttle control unit 16, and a brake control unit 17 serving in this example as units that control the travel of the host vehicle M during self-driving are coupled to the output side of the self-driving control unit 11. In one example, the camera unit 12 and the radar unit 13 may serve as a "travel environment information acquisition unit".

The self-driving control unit 11 mainly includes a well-known microcomputer including a CPU, a ROM, and a RAM and the ROM stores control programs for self-driving executed by the CPU, fixed data, and the like.

The camera unit 12 coupled to the input side of the self-driving control unit 11 includes a camera device such as a color camera having a monocular camera or a stereo camera and an image processing unit that acquire image information by taking an image of the travel environment ahead of the host vehicle and perform the predetermined image processing of the taken image. In addition, the radar unit 13 includes a radar transmitting unit such as a laser radar, millimeter-wave radar, or ultrasonic radar, a receiving unit that receives the reflected wave of the transmitted radar wave, and a distance-measuring unit that measures the distance from a front object on the basis of the difference between the transmitting timing of the radar wave and the receiving timing of the reflected wave.

In addition, the navigation system 14 acquires the position information (latitude, longitude, and altitude) of the host vehicle M by receiving position information from GNSS positioning satellites such as GPS (Global Positioning System), GLONASS (Global Navigation Satellite System), and QZSS (Quasi-Zenith Satellite System), sets the guide route from the current position of the host vehicle M to the destination in the road map information stored in advance on the basis of the obtained position information, and displays the current position of the host vehicle M and the guide route on the monitor.

On the other hand, the steering control unit 15 coupled to the output side of the self-driving control unit 11 has an electric power steering (EPS) and makes steering control so as to cause the host vehicle M to travel along the guide route by driving the electric motor of the electric power steering according to a steering signal from the self-driving control unit 11.

In addition, the throttle control unit 16 makes control so that the vehicle speed (host vehicle speed) of the host vehicle M equals a target vehicle speed by opening and closing the electric throttle valve under electronic throttle control (ETC) provided together with the engine according to a throttle opening degree signal from the self-driving control unit 11.

In addition, the brake control unit 17 adjusts the brake hydraulic pressures of brake wheel cylinders provided for wheels. When determining that the vehicle speed cannot be reduced to a target vehicle speed only by engine braking by fully closing the throttle valve, the self-driving control unit 11 outputs a brake hydraulic pressure signal to the brake control unit 17, performs braking by operating the brake wheel cylinders using the brake hydraulic pressures having been adjusted to a predetermined value, and forcibly reduces the host vehicle speed to the target vehicle speed.

The self-driving control unit 11 sets the target traveling path for traveling in a predetermined position (the middle of the travel lane defined by the left and right marking lines in this example) in the width direction of the travel lane on the basis of the guide route set by the navigation system 14 and the travel environment information ahead of the host vehicle M acquired by the camera unit 12 and the radar unit 13 and outputs, to the steering control unit 15, a steering signal for causing the host vehicle M to travel along the target traveling path. In addition, the self-driving control unit 11 detects whether a preceding vehicle P or an obstacle 21 (such as a stopped vehicle, falling object, under-construction area, see FIGS. 4A to 4C) is present in the traveling path ahead of the host vehicle M on the basis of travel environment information ahead of the host vehicle M.

When the preceding vehicle P is detected, the inter-vehicle distance between the host vehicle M and the preceding vehicle P and the relative vehicle speed between the host vehicle M and the preceding vehicle P are calculated. When the vehicle speed of the preceding vehicle P is less than that of the host vehicle speed and the inter-vehicle distance is less than the target inter-vehicle distance set to keep the inter-vehicle distance, the target vehicle speed for keeping the inter-vehicle distance between the host vehicle M and the preceding vehicle P at the target inter-vehicle distance is set, the drive signals for setting the host vehicle speed to the target vehicle speed are output to the throttle control unit 16 and the brake control unit 17, and travel control (ACC (Adaptive Cruise Control) control) is made while keeping the inter-vehicle distance. Alternatively, when the obstacle 21 is detected, the steering angle and the target vehicle speed for avoiding the obstacle 21 are set and the drive signals are output to the control units 15 to 17 to make obstacle avoidance control.

In addition, the self-driving control unit 11 determines whether the preceding vehicle P has taken an obstacle avoidance action and, when the preceding vehicle P has taken an obstacle avoidance action, makes preceding vehicle following control that causes the host vehicle M to travel along the traveling path of the preceding vehicle P.

Figure 2:
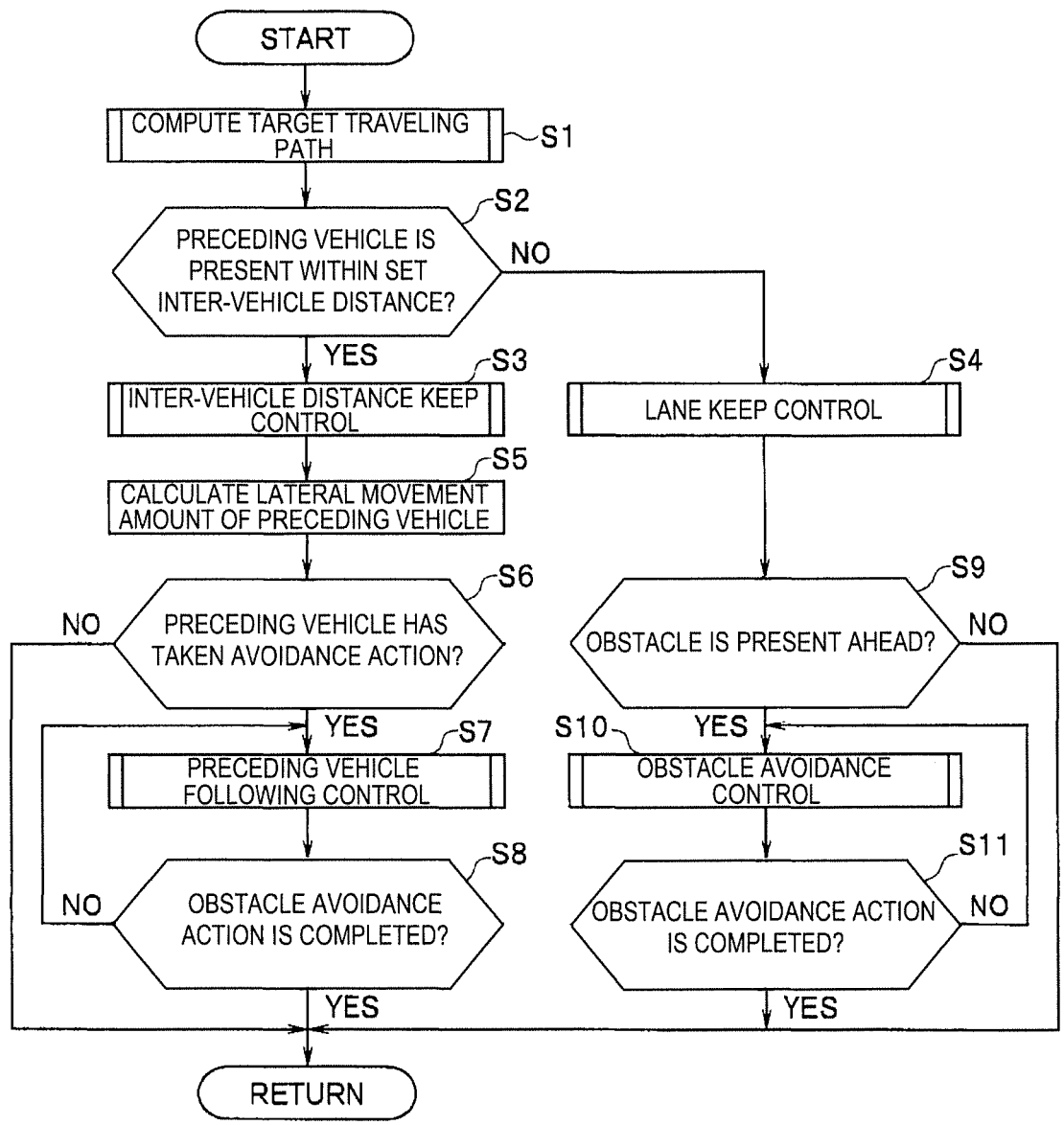
FIG. 2 is a flowchart illustrating a self-driving control routine.

The self-driving control made by the self-driving control unit 11 is specifically processed according to the self-driving control routine illustrated in FIG. 2.

In step S1, this routine first detects the left and right marking lines (lane lines) that define the lane (travel lane) in which the host vehicle M is currently traveling on the basis of the guide route from the current position to the destination set by the navigation system 14 and the travel environment information ahead of the host vehicle M detected by the camera unit 12 and the radar unit 13, and calculates the target traveling path for traveling (moving), for instance, in the middle of the lane defined by the left and right marking lines. In one example, the processing in this step may serve as a "target traveling path setting unit".

Next, the processing proceeds to step S2 and determines whether the preceding vehicle P is present within the inter-vehicle distance set when preceding vehicle inter-vehicle distance keep control is made via ACC control in the target traveling path on the basis of the travel environment information ahead of the host vehicle M detected by the camera unit 12 and the radar unit 13. It should be noted that the inter-vehicle distance is a variable that becomes larger as the host vehicle speed increases.

The processing proceeds to step S3 when the preceding vehicle P is present within the set inter-vehicle distance or the processing branches to step S4 when the preceding vehicle P is not detected within the set inter-vehicle distance.

After the processing proceeds to step S3, inter-vehicle distance keep control via ACC control is made and the processing proceeds to step S5. In this inter-vehicle distance keep control, for instance, the target steering angle for lane keep travel of the host vehicle M along the target traveling path is set and the target vehicle speed is set on the basis of the relative vehicle speed between the host vehicle M and the preceding vehicle P. Then, under opening control of the throttle valve by the throttle control unit 16 and braking control by the brake control unit 17, the host vehicle M is caused to follow the preceding vehicle P while keeping the inter-vehicle distance set according to the host vehicle speed. In addition, the self-driving control unit 11 makes steering control for traveling the host vehicle M along the target traveling path by outputting, to the steering control unit 15, the steering signal for making the steering angle close to the target steering angle.

Next, after the processing proceeds to step S5, the lateral movement amount of the preceding vehicle P is calculated. In one example, the processing in this step may serve as a "lateral movement amount calculation unit".

Figure 3A:
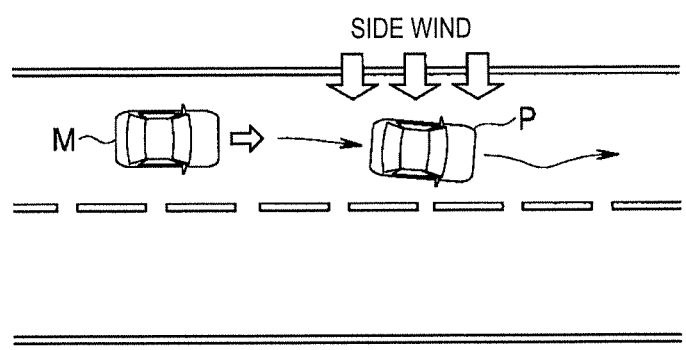
FIG. 3A illustrates the state in which a preceding vehicle is staggering by receiving lateral disturbance and FIG. 3B illustrates the state in which a host vehicle is traveling while keeping a set inter-vehicle distance from the preceding vehicle by lane keep control.
Figure 3B:
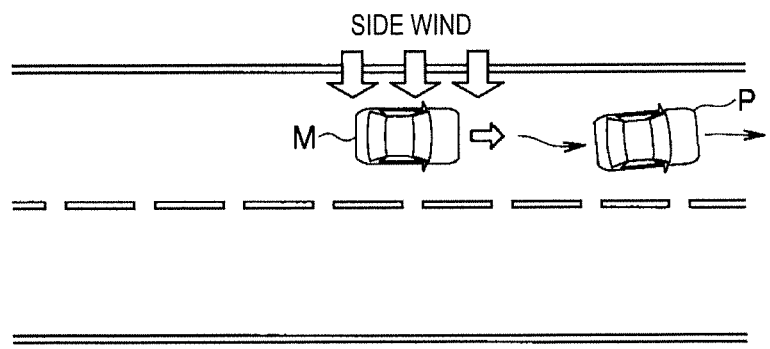
Figure 4A:
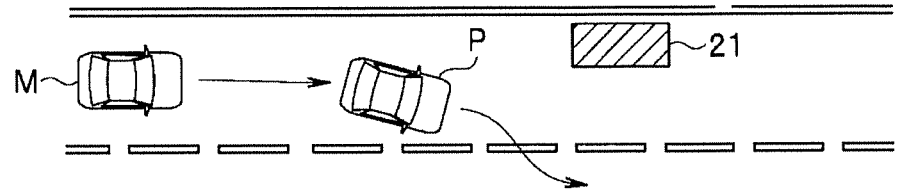
FIG. 4A illustrates the state in which the preceding vehicle starts an obstacle avoidance action.
Figure 4:
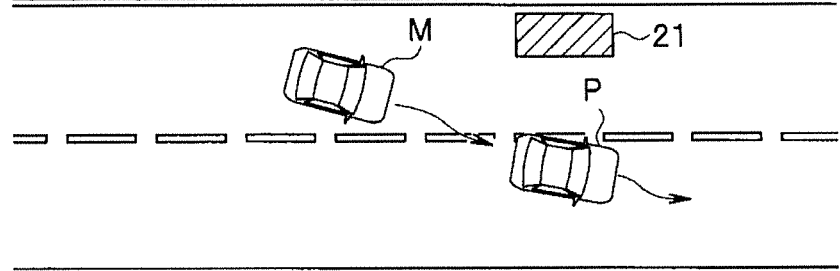
FIG. 4B illustrates the state in which the host vehicle starts an obstacle avoidance action under preceding vehicle following control.
FIG. 4C illustrates the state in which the host vehicle is taking an obstacle avoidance action under preceding vehicle following control.
Figure 4:
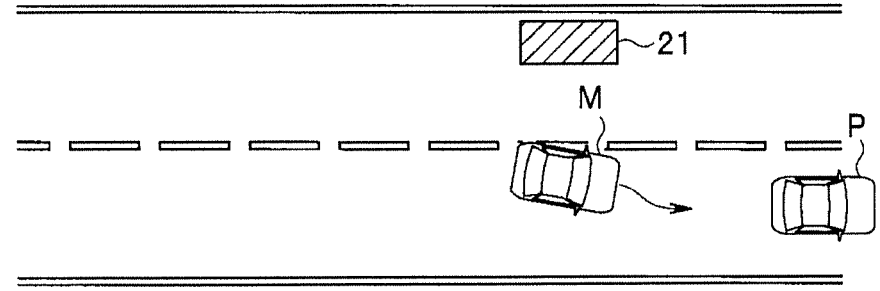

The preceding vehicle P may stagger because of the cant (lateral inclination) of a road surface, effects of disturbance such as side wind illustrated in FIGS. 3A and 3B, inattentive driving, or the like even when traveling in a straight path. In addition, when an obstacle (such as a stopped vehicle, a falling object, or an under-construction area) 21 is present ahead of the preceding vehicle P as illustrated in FIG. 4A, the preceding vehicle P takes an action for avoiding it.

On the other hand, since the preceding vehicle P is present between the host vehicle M and the obstacle 21, the camera unit 12 or the radar unit 13 installed in the host vehicle M cannot easily recognize the obstacle 21 early and it is difficult to determine whether the lateral movement of the preceding vehicle P is a simple stagger travel or an obstacle avoidance action.

Accordingly, this example determines whether lateral movement is a simple stagger travel or an obstacle avoidance action in step S6 by obtaining the initial behavior of the preceding vehicle P in step S5 above.

Figure 5:
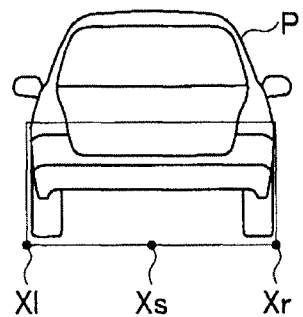
FIG. 5 illustrates how the traveling path of the preceding vehicle is set on the basis of the image of the preceding vehicle taken by an onboard camera.

In the calculation of the lateral movement amount of the preceding vehicle in step S5, first, the left and right end points Xl and Xr in the vehicle width direction of the preceding vehicle P, which are recognized by the camera unit 12 or the radar unit 13, are detected as illustrated in, for instance, FIG. 5 and the point equidistant from the end points is set as a middle point Xs of the preceding vehicle P.

Figure 6A:
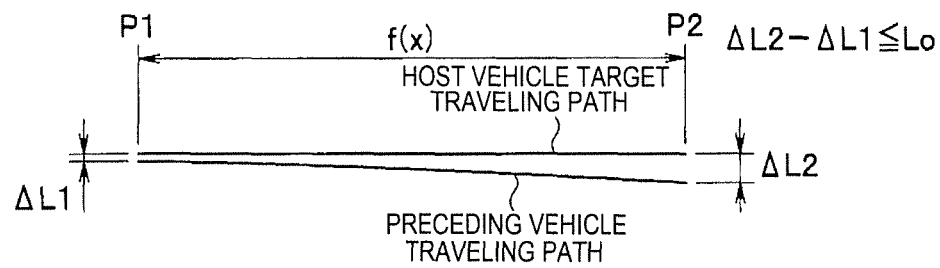
FIGS. 6A and 6B illustrate the lateral displacement amount of the traveling path of the preceding vehicle with respect to the target traveling path of the host vehicle after a lapse of a predetermined time or after movement of a predetermined distance.
Figure 6B:
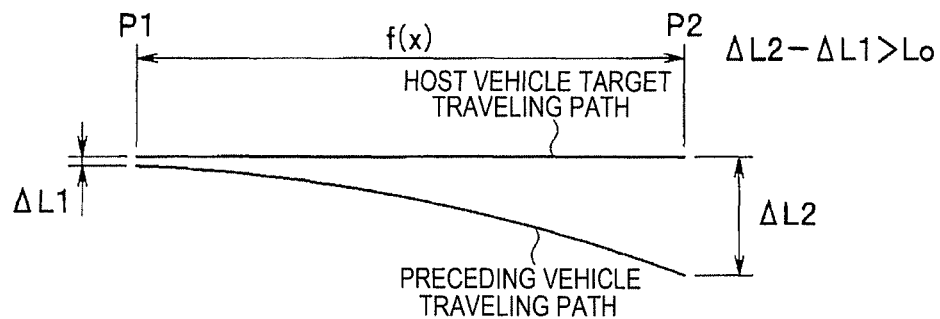

Next, as illustrated in FIGS. 6A and 6B, a preceding vehicle reference lateral position $\Delta L1$ is calculated on the basis of the difference between the position in the target traveling path of the host vehicle M when the preceding vehicle P is located at the current point P1 and the position of the middle point Xs when the preceding vehicle P is located at the current point P1. Next, a comparison lateral position $\Delta L2$ is calculated on the basis of the difference between the position in the target traveling path of the host vehicle M when the preceding vehicle P is located at the point P2 in a predetermined section function f(x) from the point P1 and the position of the middle point Xs of the preceding vehicle P. It should be noted that the section function f(x) is the factor (time or distance) that detects the initial behavior of the preceding vehicle P and f(x) is set to approximately 0.5 to 1 second when the factor is time or f(x) is set to approximately 15 to 30 meters when the factor is distance.

After that, the lateral position variation ($\Delta L2-\Delta L1$) is calculated on the basis of the difference between the comparison lateral position $\Delta L2$ and the preceding vehicle reference lateral position $\Delta L1$ and the lateral position variation ($\Delta L2-\Delta L1$) is compared with a present threshold Lo in step S6. This threshold Lo is used to determine whether the lateral initial behavior of the preceding vehicle P is a stagger travel or an obstacle avoidance action and this value is a fixed value calculated in advance by simulation or the like. In one example, the processing in this step may serve as an "obstacle avoidance action detection unit".

When ($\Delta L2-\Delta L1$)≤Lo is met, it is determined that the stagger travel has been caused by disturbance such as side wind or inattentive driving or the like, the processing exits from the routine and continues inter-vehicle distance keep control via ACC control. As a result, as illustrated in FIG. 3B, even when the host vehicle M passes through the point at which a stagger of the preceding vehicle P was detected, the host vehicle M can travel in the middle of the target traveling path defined by the left and right marking lines in the lane keeping state without being affected by the stagger of the preceding vehicle P.

In contrast, when ($\Delta L2-\Delta L1$)>Lo is met, it is determined that an obstacle avoidance action has been taken because the lateral movement amount of the preceding vehicle P is large and the processing proceeds to step S7. After the processing proceeds to step S7, preceding vehicle following control for causing the host vehicle M to follow the preceding vehicle P is made.

In the preceding vehicle following control, the traveling path (preceding vehicle traveling path) of the preceding vehicle P is calculated on the basis of, for instance, the lateral movement amount of the middle point Xs of the preceding vehicle P calculated every computation cycle and the preceding vehicle traveling path is set as the target traveling path of the host vehicle M.

As a result, when the host vehicle M reaches the point at which the preceding vehicle P started to change the traveling path for avoidance of the obstacle 21 as illustrated in FIG. 4B, preceding vehicle following control starts to change the traveling path of the host vehicle M along the traveling path of the preceding vehicle P. Accordingly, even when the front of the host vehicle M is blocked by the preceding vehicle P, the host vehicle M can rapidly and smoothly take an obstacle avoidance action with an allowance without recognizing the obstacle 21.

After that, the processing proceeds to step S8 and determines whether an obstacle avoidance action by the preceding vehicle P is completed. This obstacle avoidance action by following the preceding vehicle is determined to be completed when the host vehicle M recognizes the obstacle 21 as illustrated in, for instance, FIG. 4B. Alternatively, the obstacle avoidance action is determined to be completed when the lateral position variation of the preceding vehicle P is detected every computation cycle, the lateral position variation is compared with a preset avoidance completion determination threshold, and the lateral position variation is equal to or less than the avoidance completion determination threshold (that is, when the preceding vehicle P made a transition to a substantially straight line travel as illustrated in FIG. 4C).

When the obstacle avoidance action is not completed, the processing returns to step S7 and continues the preceding vehicle following control. Alternatively, when it is determined that the obstacle avoidance action is completed, the processing exits from the routine and computes the target traveling path from the current travel point of the host vehicle M in step S1 in the next execution of the routine.

On the other hand, the processing branches from step S2 to step S4, the target steering angle and the target vehicle speed for traveling the host vehicle M along the target traveling path are set. Then, the steering signal for making the actual steering angle close to the target steering angle is output to the steering control unit 15 and the drive signal for keeping the host vehicle speed at the target vehicle speed is output to the throttle control unit 16 and the brake control unit 17 to perform lane keep control for traveling the host vehicle M along the middle line of the travel lane.

Next, the processing proceeds to step S9 and determines whether an obstacle is present in the target traveling path ahead of the host vehicle M on the basis of travel environment information ahead of the host vehicle M acquired by the camera unit 12 and the radar unit 13. It should be noted that the obstacle includes a moving object such as a pedestrian or a bicycle in addition to a halt object such as a stopped vehicle or a falling object.

When it is determined that an obstacle is present, the processing proceeds to step S10. Alternatively, when it is determined that an obstacle is not present, the processing exits from the routine as is and continues self-driving via lane keep control in step S4.

After the processing proceeds to step S10, obstacle avoidance control is made. In this obstacle avoidance control, for instance, the arrival time necessary for the host vehicle M to reach an obstacle is calculated and a decision is made as to whether avoidance is enabled. When it is determined that avoidance is enabled, the throttle control unit 16 and the brake control unit 17 perform speed control for making the host vehicle speed close to the target vehicle speed on the basis of the target vehicle speed and the target steering angle for obstacle avoidance calculated every computation cycle. At the same time, the steering control unit 15 changes the traveling path by making steering control for matching the steering angle with the target steering angle and avoids the obstacle without stopping the host vehicle M.

In contrast, when it is determined that avoidance is difficult, the brake control unit 17 adjusts the brake hydraulic pressures of the brake wheel cylinders on the basis of the arrival time necessary for the host vehicle to reach the obstacle and causes the host vehicle M to automatically stop before the obstacle.

After that, the processing proceeds to step S11 and determines whether the obstacle avoidance action is completed. When the obstacle avoidance action is not completed, the processing returns to step S10 and continues the obstacle avoidance control. Alternatively, when it is determined that the obstacle avoidance control is completed, the processing exits from the routine. When an override by the driver, such as a steering operation or a brake operation is detected during self-driving, the self-driving is interrupted.

As described above, since this example determines whether the preceding vehicle P has taken an obstacle avoidance action on the basis of the lateral movement amount of the preceding vehicle P to be followed by the host vehicle M and sets the traveling path of the preceding vehicle P as the target traveling path of the host vehicle M when it is determined that the preceding vehicle P has taken an obstacle avoidance action, the host vehicle M can take an obstacle avoidance action with an allowance. In addition, since an obstacle avoidance action is detected on the basis of a lateral movement amount that is the initial behavior of the preceding vehicle P, it is possible to early response to an obstacle avoidance action by the preceding vehicle P.

The present invention is not limited to the example described above. For instance, even when the completion of an obstacle avoidance action has been determined in step S8 in the self-driving control routine illustrated in FIG. 2, the preceding vehicle P may be followed for a predetermined time and then a transition to the lane keep control in step S4 may be made.

The invention claimed is:

1. A vehicle travel support device comprising:
   a guide route setting unit configured to set a guide route for a host vehicle;
   a travel environment information acquisition unit configured to acquire travel environment information ahead of the host vehicle;
   a target traveling path setting unit configured to set a target traveling path through which the host vehicle travels along a travel lane of the guide route on a basis of the guide route set by the guide route setting unit and the travel environment information acquired by the travel environment information acquisition unit;
   an inter-vehicle distance keep control unit configured to cause the host vehicle to travel so as to keep a set inter-vehicle distance from the preceding vehicle traveling in the target traveling path immediately ahead of the host vehicle when a preceding vehicle is detected on a basis of the travel environment information acquired by the travel environment information acquisition unit;
   a lateral movement amount calculation unit configured to calculate a lateral movement amount of the preceding vehicle on a basis of a lateral position variation of the preceding vehicle relative to the target traveling path acquired by the travel environment information acquisition unit;
   an obstacle avoidance action detection unit configured to detect an obstacle avoidance action of the preceding vehicle on a basis of the lateral movement amount of the preceding vehicle calculated by the lateral movement amount calculation unit; and
   a preceding vehicle following controller configured, when the obstacle avoidance action detection unit detects the obstacle avoidance action of the preceding vehicle, to set the target traveling path for the host vehicle to a traveling path of the preceding vehicle and to cause the host vehicle to travel therethrough, wherein the lateral movement amount calculation unit configured to obtain a first lateral position of the preceding vehicle relative to the target traveling path, after the first lateral position is obtained and then a preset time elapses or the host vehicle travels a preset distance, obtain a second lateral position of the preceding vehicle relative to the target traveling path, and calculate the lateral position variation from a difference between the first lateral position and the second lateral position.

2. The vehicle travel support device according to claim 1, wherein the lateral movement amount calculation unit calculates the lateral movement amount on a basis of the lateral position variation of the preceding vehicle relative to the target traveling path within a preset section time.

3. The vehicle travel support device according to claim 1, wherein the lateral movement amount calculation unit calculates the lateral movement amount on a basis of the lateral position variation of the preceding vehicle relative to the target traveling path within a preset section distance.

4. A vehicle travel support device comprising:
- a guide route setting unit configured to set a guide route for a host vehicle;
- a travel environment information acquisition unit configured to acquire travel environment information ahead of the host vehicle;
- a target traveling path setting unit configured to set a target traveling path through which the host vehicle travels along a travel lane of the guide route on a basis of the guide route set by the guide route setting unit and the travel environment information acquired by the travel environment information acquisition unit;
- an inter-vehicle distance keep control unit configured to cause the host vehicle to travel so as to keep a set inter-vehicle distance from the preceding vehicle traveling in the target traveling path immediately ahead of the host vehicle when a preceding vehicle is detected on a basis of the travel environment information acquired by the travel environment information acquisition unit;
- a lateral movement amount calculation unit configured to, based on behavior of the preceding vehicle acquired by the travel environment information acquisition unit,
  obtain a first lateral position of the preceding vehicle relative to the target traveling path, and
  after the first lateral position is obtained and then a preset time elapses or the host vehicle travels a preset distance, obtain a second lateral position of the preceding vehicle relative to the target traveling path;
- an obstacle avoidance action detection unit configured to obtain a difference between the first lateral positon and the second lateral position, and when the difference is greater than a threshold value, determine that the preceding vehicle takes an obstacle avoidance action; and
- a preceding vehicle following controller configured, when the obstacle avoidance action detection unit detects the obstacle avoidance action of the preceding vehicle, to set the target traveling path for the host vehicle to a traveling path of the preceding vehicle and to cause the host vehicle to travel therethrough.

* * * * *